(12) United States Patent
Ishikawa

(10) Patent No.: US 8,411,302 B2
(45) Date of Patent: Apr. 2, 2013

(54) PRINTING SYSTEM, PRINTING APPARATUS AND PRINT CONTROL METHOD THEREFOR

(75) Inventor: Akira Ishikawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 996 days.

(21) Appl. No.: 12/333,123

(22) Filed: Dec. 11, 2008

(65) Prior Publication Data

US 2009/0153900 A1 Jun. 18, 2009

(30) Foreign Application Priority Data

Dec. 17, 2007 (JP) ................................. 2007-325210

(51) Int. Cl.
*G06F 15/00* (2006.01)
*G06K 1/00* (2006.01)

(52) U.S. Cl. .......................... 358/1.15; 358/1.9; 358/1.13

(58) Field of Classification Search .......................... None
See application file for complete search history.

(56) References Cited

U.S. PATENT DOCUMENTS 7,180,626 B1 * 2/2007 Gassho et al. ................. 358/1.6

2002/0133653 A1 * 9/2002 Reilly ........................... 710/107

FOREIGN PATENT DOCUMENTS

| JP | 7-13721 A | 1/1995 |
| JP | 7-72993 A | 3/1995 |
| JP | 7-121330 | 5/1995 |

* cited by examiner

*Primary Examiner* — Thierry Pham
(74) *Attorney, Agent, or Firm* — Fitzpatrick, Cella, Harper & Scinto

(57) ABSTRACT

When an instruction to transfer a print job, which has been issued from a print data source to Device A, to Device B is made, a transfer request for the job is issued from Device A to Device B (1502). Device B then spools the transfer request in a print queue and issues a job data transmission request for the print job to Device A at a timing at which Device B can execute the transfer request (1503). In response to the transmission request, Device A transmits job data to Device B (1504), and Device B prints the job data (1505). Through this, an unnecessary transfer of job data from a device to another device can be eliminated, and thus throughput during transfer of job data is improved.

9 Claims, 15 Drawing Sheets

PRINTING SYSTEM, PRINTING APPARATUS AND PRINT CONTROL METHOD THEREFOR

BACKGROUND OF THE INVENTION

1. Field of the Invention

The present invention relates to a printing system in which a plurality of printing apparatuses are connected via a network, a printing apparatus, and a print control method thereof.

2. Description of the Related Art

Along with wide distribution of network environments, printer apparatuses and multi-function apparatuses (MFPs, or multi-function peripherals) that are capable of connecting to networks have emerged, and now shared use of multiple MFPs by multiple users has become common in office environments. In such environments, an MFP is often installed in a location that is remote from most of the users. Accordingly, a situation can occur in which a job is not executed or the execution of a job is delayed due to problems that have occurred in the MFP, heavy job traffic, etc. If such a situation occurs, the user becomes aware of the fact that a job has not been executed only after he/she goes to the location where the MFP is installed to pick up a printed copy, only to find that the printed copy has not been outputted.

In order to solve such a problem, a proposal has been made in which an instruction is given directly to the apparatus holding a job unexecuted due to the occurrence of delay, or the unexecuted job is automatically transferred to another apparatus capable of printing in order to print the job.

Also, Japanese Patent Laid-Open No. 7-proposes a technique for executing printing in a convenient manner by transferring a job among apparatuses when plural shared apparatuses are present.

In order to cause an unexecuted job transferred from a first apparatus in which a processing delay has occurred to a second apparatus to be printed by the second apparatus, it is necessary to transfer the data of the job from the first apparatus to the second apparatus. For example, to transfer large-size job data including image data, the job data must be transferred via a network, and written into the hard disk of the apparatus to which the job data is transferred, which requires a large amount of time. As such, various problems occur if the transfer of the job data starts at the timing at which the user has provided the instruction to transfer the job.

FIG. 5 is a diagram illustrating a problem encountered in the conventional technology as described above.

In this example, a print job has been issued from Terminal to Device A, but Device A is in an error state, namely, is out of toner. As such, Device A transfers the print job to Device B and instructs Device B to print the job. However, Device B is in a state in which it is unable to perform printing due to paper jam error. Accordingly, Device B further transfers the print job to Device C to cause Device C to print the job.

When a print job is transferred from Device A to Device B, and then further transferred to Device C, Device A attempts to instruct Device B to transfer the print job to Device C, but a case may occur in which the transfer of the job data from Device A to Device B has not yet finished at that point in time. If such a case occurs, it is necessary for the user to wait for the transfer of the job data from Device A to Device B to finish, and he/she can provide an instruction to transfer the job data from Device B to Device C only thereafter. The transfer of the job data to Device C starts only after the instruction is provided by the user. In this case, the transfer of the job data from Device A to Device B is unnecessary, and the time required for the transfer not only causes a reduction in the throughput, but can also result in an increase in network traffic.

FIG. 6 is a diagram illustrating another problem encountered in conventional technology.

In FIG. 6, plural jobs, or Jobs 0 to 5, have been issued from Terminal to Device A, but Device A is unable to perform printing because it is in an error state, namely, is in out of toner. In this case, Device A transfers Jobs 0 to 4, which are to be printed in color, to Device B, which is capable of color printing, and Job 5 to Device C, which is capable of monochrome printing. However, the fifth job, or Job 5, is not transferred until the transfer of Jobs 0 to 4 is completed. Accordingly, Device C remains in a standby state during the transfer of Jobs 0 to 4. The time spent in such a standby state reduces the throughput until all of the jobs finish printing.

SUMMARY OF THE INVENTION

The present invention is designed to prevent an increase in network traffic and wait time for printing by eliminating an unnecessary transfer process of job data when a print job is transferred to be printed by another printing apparatus.

One aspect of the present invention provides a printing system including a first printing apparatus and a second printing apparatus that are connected via a network, the printing system comprising a first issuing unit configured to, when a print job stored in the first printing apparatus is to be transferred to the second printing apparatus, cause the first printing apparatus to issue a transfer request of the print job to the second printing apparatus, a second issuing unit configured to spool the transfer request in a print queue of the second printing apparatus, and to cause the second printing apparatus to issue a job data transmission request for the print job corresponding to the transfer request to the first printing apparatus when the transfer request reaches a predetermined position in the print queue and a unit configured to cause the first printing apparatus to transmit the job data to the second printing apparatus in response to the transmission request, and to cause the second printing apparatus to print the job data.

Another aspect of the present invention provides a printing apparatus connected to another printing apparatus via a network, the apparatus comprising a print queue that stores inputted print jobs, an issuing unit configured to, when a print job stored in the print queue is to be transferred to the another printing apparatus, issue a transfer request for the print job to the another printing apparatus, a receiving unit configured to receive a job data transmission request for the print job transmitted from the another printing apparatus in response to the transfer request issued by the issuing unit and a transmission unit configured to transmit job data of the print job stored in the print queue to the another printing apparatus in response to the transmission request received by the receiving unit.

Still other aspect of the present invention provides a printing apparatus connected to another printing apparatus via a network, the apparatus comprising a unit configured to, upon receiving a transfer request for a print job received from the another printing apparatus, store the transfer request in a print queue, a transmission unit configured to transmit a job data transmission request for the print job to the another printing apparatus when the transfer request stored in the print queue reaches a predetermined position in the print queue, a unit configured to receive job data of the print job transmitted from the another printing apparatus in response to the transmission request transmitted by the transmission unit; and a printing unit configured to perform printing based on the job data.

Yet other aspect of the present invention provides a print control method for a printing system including a first printing apparatus and a second printing apparatus that are connected via a network, the method comprising when a print job stored in the first printing apparatus is to be transferred to the second printing apparatus, causing the first printing apparatus to issue a transfer request for the job to the second printing apparatus spooling the transfer request issued in the issuing step in a print queue of the second printing apparatus, and causing the second printing apparatus to issue a job data transmission request for the print job corresponding to the transfer request to the first printing apparatus when the transfer request reaches a predetermined position in the print queue and causing the first printing apparatus to transmit the job data to the second printing apparatus in response to the transmission request, and causing the second printing apparatus to print the job data.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Figure 1:
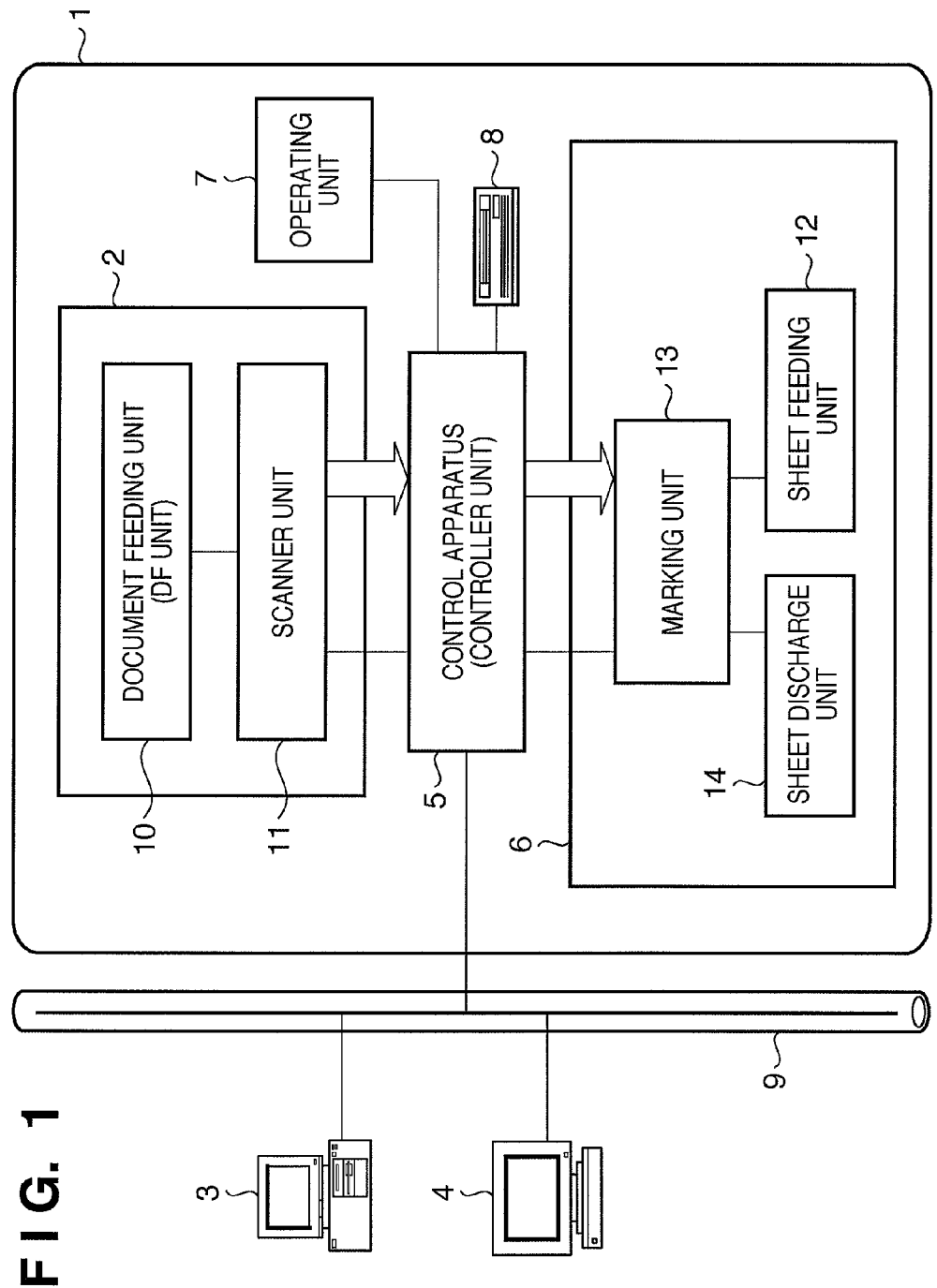
FIG. 1 is a block diagram showing a configuration of a multi-function processing apparatus (multi-function peripheral, or MFP) according to an embodiment of the present invention.

FIG. 1 is a block diagram showing a configuration of a multi-function processing apparatus (multi-function peripheral, hereinafter referred to as "MFP") according to Embodiment 1 of the present invention.

The MFP 1 is connected to host computers (PCs 3 and 4 in the present embodiment) via a LAN (local area network) 9 such as Ethernet®. The MFP 1 includes a reader unit 2 that performs an image data readout process, and a printer unit 6 that prints the image data. An operating unit 7 is equipped with a liquid crystal panel that displays a keyboard for image data input and output operations, the image data itself, various functions, etc. A hard disk drive 8 is used to store image data and received print jobs, which shall be described later. A controller unit 5 is connected to and controls these constituent elements. The PCs 3 and 4 also function as print data sources that supply print data to the MFP 1. When making copies, the reader unit 2 functions as a print data source.

The reader unit 2 includes a document feeding unit 10 that conveys original documents and a scanner unit 11 that optically reads out images of original documents and converts the read-out images into image data in the form of an electric signal.

The printer unit 6 also includes a sheet feeding unit 12 equipped with a plurality of sheet feed cassettes for storing recording sheets, a marking unit 13 that transfers and fixes image data onto recording sheets, and a sheet discharge unit 14 that performs a sorting process or stapling process on printed recording sheets and discharges them to the outside.

Figure 2:
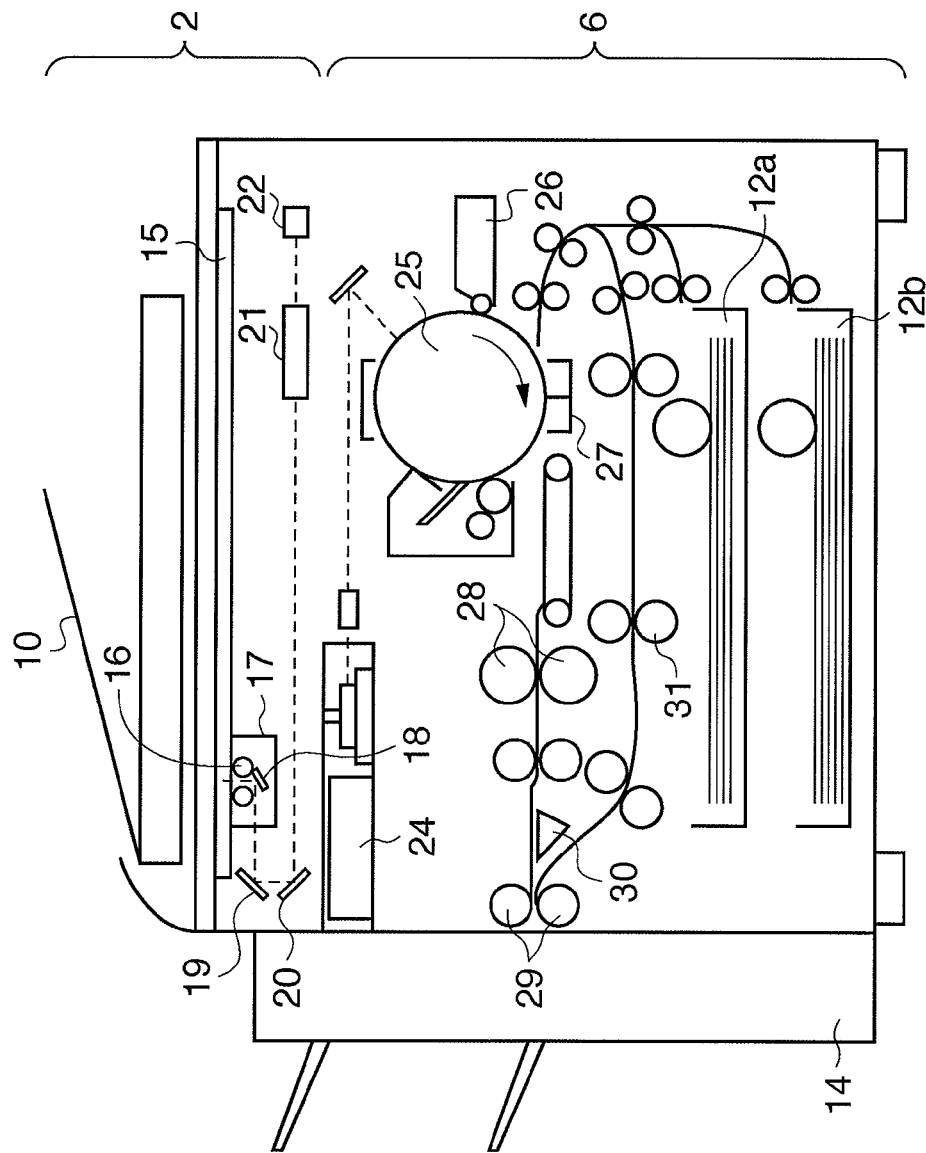
FIG. 2 is a cross-sectional diagram illustrating in detail a structure of a reader unit and a printer unit of the MFP according to the embodiment of the present invention.

FIG. 2 is a cross-sectional diagram illustrating in detail a structure of the reader unit 2 and the printer unit 6 of the MFP 1 according to Embodiment 1.

In the reader unit 2, a stack of original documents placed on the document feeding unit 10 are supplied sequentially onto a platen glass 15 sheet by sheet, starting from the top of the stack and moving downward through the stack. After having undergone a predetermined readout operation performed by the scanner unit 11, read-out original documents are discharged from the platen glass 15 to the document feeding unit 10. In the scanner unit 11, when an original document is conveyed to the platen glass 15, a lamp 16 is lit, and then an optical unit 17 starts moving and stops at the readout position. The optical unit 17 scans the conveyed original document by irradiating the document with light from below. The light reflected by the original document is directed, through a plurality of mirrors 18 to 20 and a lens 21, to a CCD image sensor (hereinafter referred to as "CCD") 22, where the light is converted to an electric signal. Original documents are read out by the CCD 22 in this manner. Image data thus read out by the CCD 22 and outputted in the form of an electric signal undergoes a predetermined process, and is then transferred to the controller unit 5.

The printer unit 6 shall be described next.

Laser light corresponding to the image data outputted from the controller unit 5 is emitted from a laser emitting unit 24 driven by a laser driver. The laser light is irradiated to a photosensitive drum 25 of the marking unit 13, forming an electrostatic latent image corresponding to the laser light on the surface of the drum. Then, toner supplied from a developer 26 is applied to the electrostatic latent image and developed.

On the other hand, a recording sheet is supplied from the sheet feeding unit 12 (sheet feed cassette 12a, 12b) and conveyed to a transfer unit 27 at a timing in synchronization with the start of laser light irradiation. The toner image on the photosensitive drum 25 is then transferred to the recording sheet by the transfer unit 27. The recording sheet to which the image has been transferred in the manner described above is conveyed to a fixing unit 28, where the image is fixed to the recording sheet through a heating/pressurizing process.

Here, when an image is printed on a single side of a recording sheet, the recording sheet that has passed through the fixing unit 28 is discharged directly to the sheet discharge unit 14 by discharge rollers 29. The sheet discharge unit 14 stacks and sorts discharged recording sheets, and staples the sorted recording sheets. Conversely, when images are printed on both sides of a recording sheet, the discharge rollers 29 are rotated in the reverse direction when a single-side-printed recording sheet is conveyed to the discharge rollers 29. After that, the recording sheet is guided to a sheet re-feed conveying path 31 by a flapper 30, and is conveyed through the sheet re-feed conveying path 31 to the transfer unit 27, where an image is once again transferred in the same manner as described above, this time onto the other side of the recording sheet whose one side has already been printed.

The MFP 1 has a scanner function for converting image data read out by the reader unit 2 into code and transmitting the code to the first and second host computers (PCs) 3 and 4 via the LAN 9. Furthermore, the MFP 1 also has a printer function for converting code data received from the PCs 3 and 4 via the LAN 9 into image data and outputting the image data to the printer unit 6 to print, as well as other function blocks.

Figure 3:
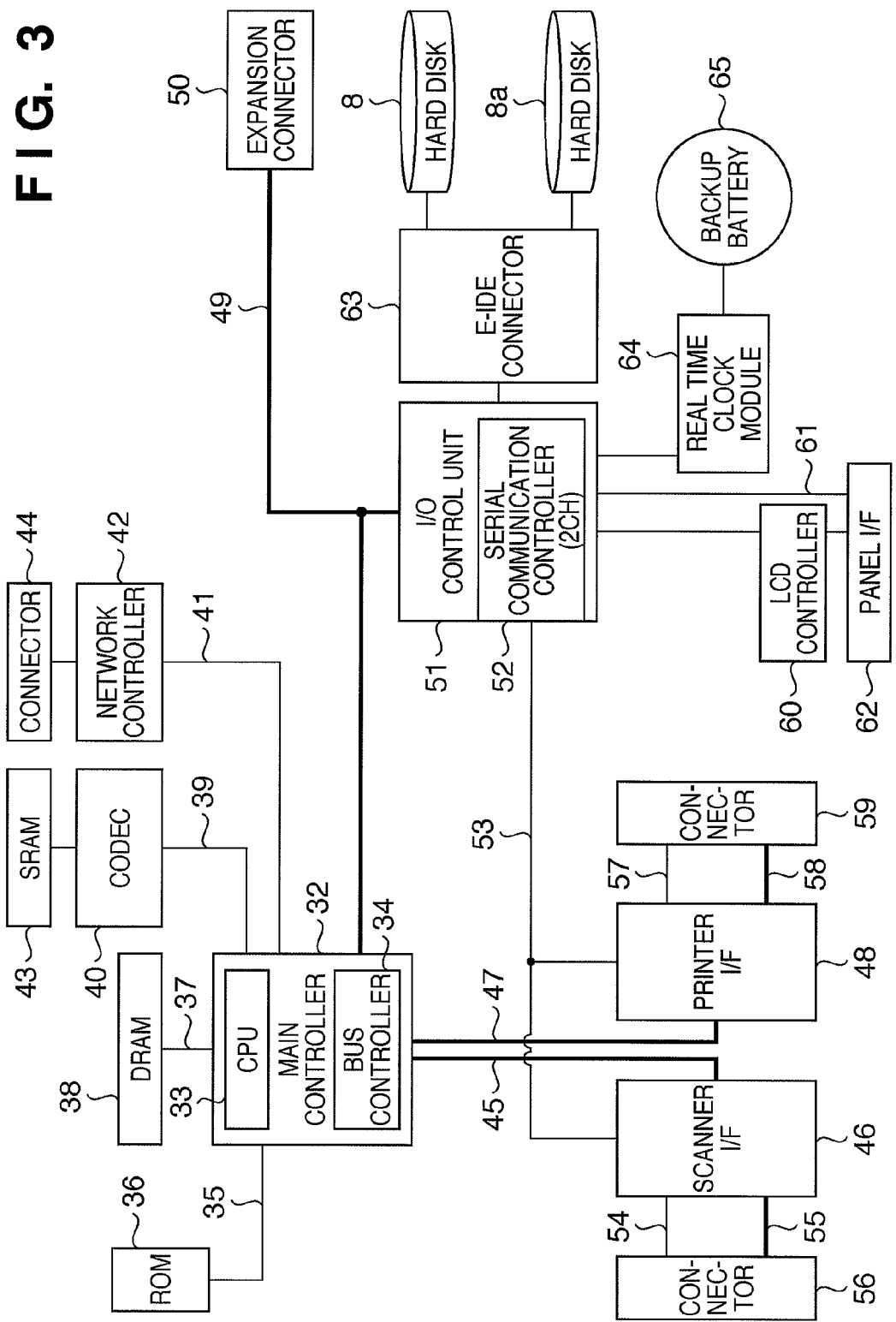
FIG. 3 is a block diagram illustrating in detail a controller unit of the MFP according to the embodiment of the present invention.

FIG. 3 is a block diagram showing in detail the controller unit 5 of the MFP 1 according to the present embodiment.

A main controller 32 includes a CPU 33, a bus controller 34, and a function block (described later) including various controller circuits. The main controller 32 is connected to a ROM 36 via a ROM I/F 35 and to a DRAM 38 via a DRAM I/F 37. The main controller 32 is also connected to a codec 40 via a codec I/F 39 and to a network controller 42 via a network I/F 41. The ROM 36 checks various control programs executed by the CPU 33 of the main controller 32 and computational data. The DRAM 38 is used as a working area for the CPU 33 to operate and an area for storing image data. The codec 40 compresses raster image data stored in the DRAM 38 in a known compression format such as MH, MR, MMR or JBIG, and decompresses compressed data into a raster image. The codec 40 is also connected to a SRAM 43, and the SRAM 43 is used as a temporary working area for the codec 40. The network controller 42 performs a predetermined control operation between the controller unit 5 and the LAN 9 via a connector 44.

The main controller 32 is also connected to a scanner I/F 46 via a scanner bus 45 and to a printer I/F 48 via a printer bus 47. Furthermore, the main controller 32 is also connected to an expansion connector 50 for connecting to an expansion board and to an input/output control unit (I/O control unit) 51 via a generic high-speed bus 49 such as a PCI bus. The I/O control unit 51 is equipped with a 2-channel asynchronous serial communication controller 52 for transmitting and receiving control commands to and from the reader unit 2 and the printer unit 6. The serial communication controller 52 is connected to the scanner I/F 46 and the printer I/F 48 via an I/O bus 53. The scanner I/F 46 is connected to a scanner connector 56 via an asynchronous serial I/F 54 and a video I/F 55. The scanner connector 56 is connected to the scanner unit 11 of the reader unit 2. The scanner I/F 46 performs a binarization process or scaling process in the main scan direction and/or the sub-scan direction on the image data received from the scanner unit 11. The scanner I/F 46 also generates a control signal based on the video signal sent from the scanner unit 11, and transfers the generated signal to the main controller 32 via the scanner bus 45.

The printer I/F 48 is connected to a printer connector 59 via an asynchronous serial I/F 57 and a vide I/F 58. The printer connector 59 is connected to the marking unit 13 of the printer unit 6. The printer I/F 48 performs a smoothing process on the image data outputted from the main controller 32, and outputs the image data to the marking unit 13 to print the image data.

The CPU 33 operates based on a control program loaded from the ROM 36 via the ROM I/F 35. For example, the CPU 33 interprets PDL (Page Description Language) data received from the PCs 3 and 4, and expands the data into raster image data. The bus controller 34 controls transfer of data inputted and outputted to and from external devices connected to the scanner I/F 46, the printer I/F 48, the expansion connector 50, etc., and performs arbitration when contention occurs between buses or controls DMA data transfer. Specifically, for example, the data transfer between the DRAM 38 and the codec 40, the data transfer from the scanner unit 11 to the DRAM 38, the data transfer from the DRAM 38 to the marking unit 13, and the like are controlled by the bus controller 34, and the transfers are performed through DMA transfer. The I/O control unit 51 is connected to a panel I/F 62 via an LCD controller 60 and a key input I/F 61. The panel I/F 62 is connected to the operating unit 7.

The I/O control unit 51 is also connected to an EEPROM 66, which is a nonvolatile memory, as well as to hard disk drives 8 and 8a via an E-IDE connector 63, and to a real time clock module 64 that updates and saves the date and time managed by the MFP 1. The real time clock module 64 is connected to a backup battery 65 for backup. Thus, the real time clock module 64 can keep time even when the MFP 1 is turned off.

Figure 4:
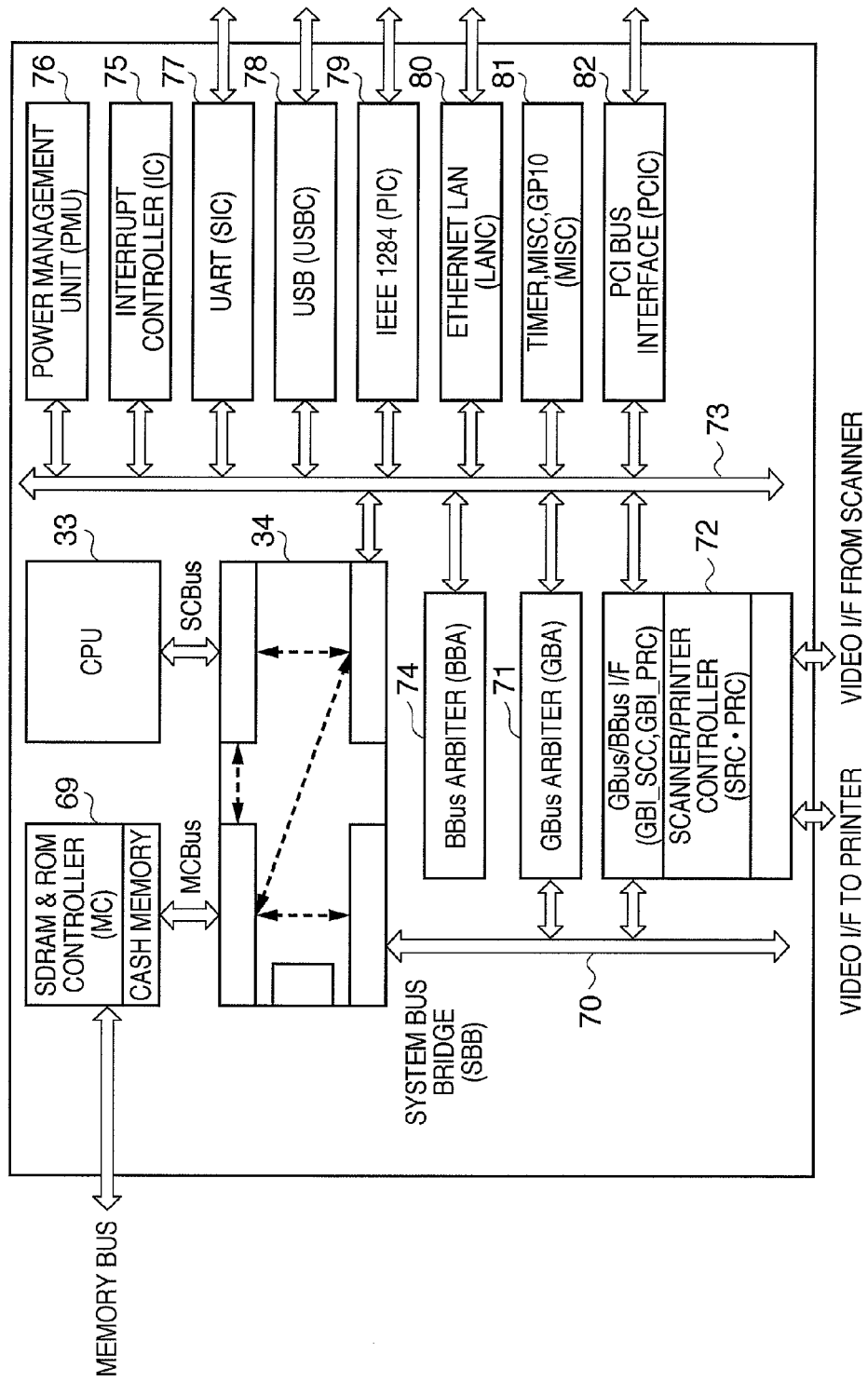
FIG. 4 is a block diagram illustrating in detail an internal configuration of a main controller according to the embodiment of the present invention.
Figure 5:
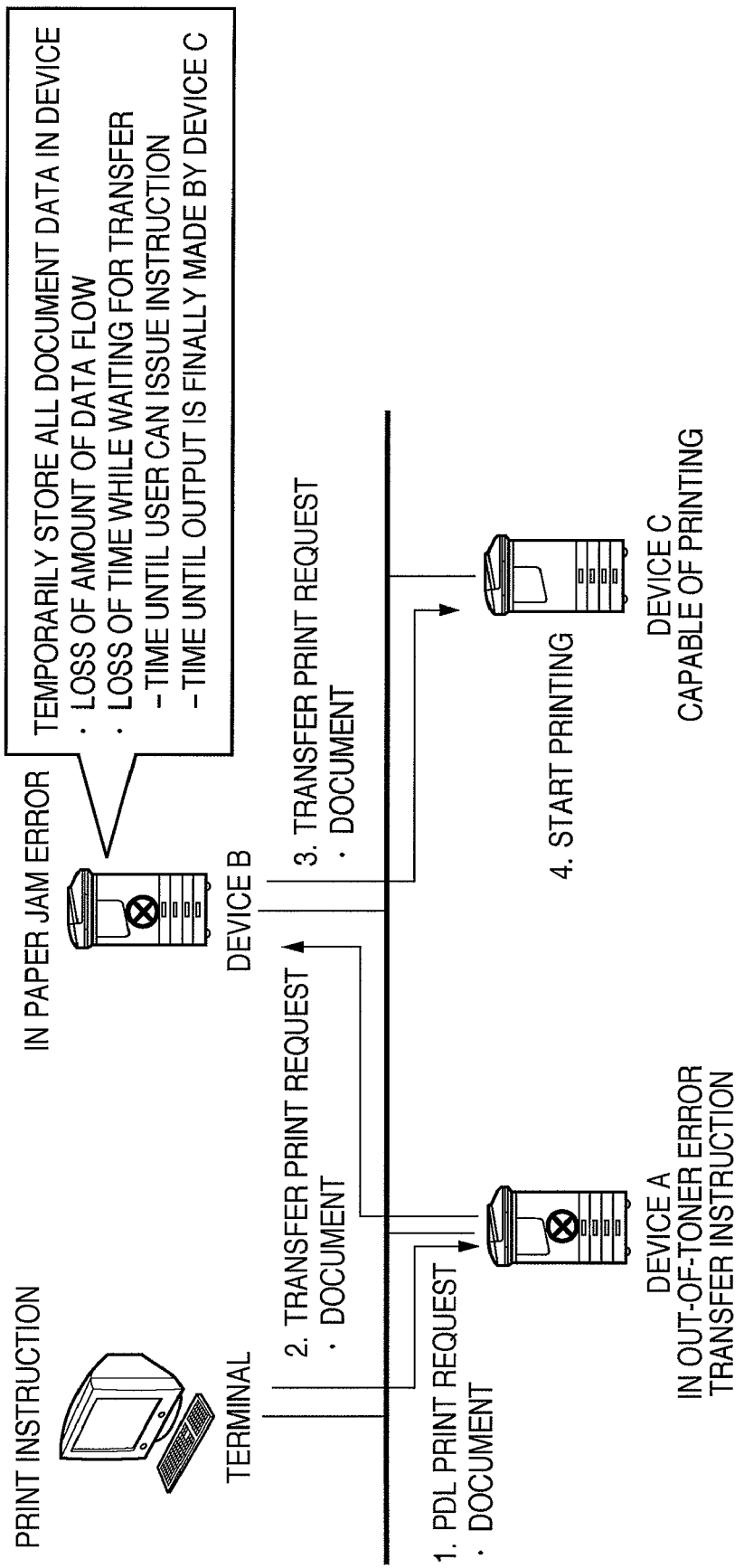
FIG. 5 is a diagram illustrating a problem encountered in conventional technology.

FIG. 4 is a block diagram illustrating in detail an internal configuration of the main controller 32 according to the present embodiment.

The bus controller 34 is configured with a 4×4 64-bit cross bus switch, and is connected to the CPU 33 via a 64-bit processor bus (P bus) 67. The bus controller 34 is also connected to a memory controller 69 equipped with a cache memory 69a via a local bus (M bus) 68 that is dedicated to the memory. The memory controller 69 is connected to memories such as the ROM 36 and the DRAM 38, and controls the operation of these memories. Furthermore, the bus controller 34 is connected to a G bus arbiter 71 and a scanner/printer controller 72 via a graphic bus (G bus) 70, and is also connected to a B bus arbiter 74, the G bus arbiter 71, an interrupt controller 75 and various function blocks via an input/output bus (B bus) 73.

The various function blocks include a power management unit 76, a serial I/F controller 77 such as a UART, a USB (Universal Serial Bus) controller 78, a parallel I/F controller 79 such as the IEEE 1284, a LAN controller 80, a generic input/output controller 81, a PCI bus I/F 82 that controls I/F operation between the B bus 73 and an external PCI bus, a scanner/printer controller 72, etc.

The B bus arbiter 74 is an arbiter that coordinates and controls access to the B bus 73. Upon receiving requests to use the B bus 73, it performs arbitration and allocates a permission to use the bus to a selected master. This prohibits two or more masters from having simultaneous access to the bus. The arbitration scheme has three priority levels, and priorities are assigned to a plurality of masters.

The interrupt controller 75 collects interrupts from each function block and external devices of the controller unit 5 described above, and redistributes them to the controllers 72 and 77 to 82 supported by the CPU 33 and a non-maskable interrupt (NMI). The power management unit 76 manages the electric power for each function block, and monitors the amount of power consumption of the controller unit 5 as an electronic component configured with a single chip. In other words, the controller unit 5 is configured with a large-scale ASIC (application specific IC) including the CPU 33 therein. For this reason, if all of the function blocks operate at the same time, a large amount of heat is generated, which may cause damage to the controller unit 5 itself.

In order to prevent such an incident, power consumption is managed for each function block, and the amount of power consumption of each function block is collected as a power management level by the power management unit 76. The power management unit 76 then sums up the amount of power consumption of each function block, and collectively monitors the amount of power consumption of each function block such that the amount of power consumption does not exceed a power consumption limit. The G bus arbiter 71 coordinates and controls access to the G bus 70 using a central arbitration scheme, and supplies dedicated request signal and permit signal to each bus master. As a scheme for assigning priority to a bus master, an equal arbitration mode can be specified in which priority for using a bus is equally assigned to all of bus masters. Alternatively, a priority arbitration mode can be specified in which priority for using a bus is assigned only to any one of bus masters.

FIGS. 7 to 10 are diagrams illustrating an overall configuration of the printing system, a data flow, and data structures. FIGS. 11 to 14 are flowcharts illustrating the control of a transfer source device and a transfer destination device in print processing.

For the sake of simplicity, the present embodiment is described in the context of the image output apparatuses of the present embodiment being multi-function peripherals (MFPs), but other apparatuses may be used as long as they are image input/output apparatuses capable of being connected to a network and outputting images as visible images.

Figure 7:
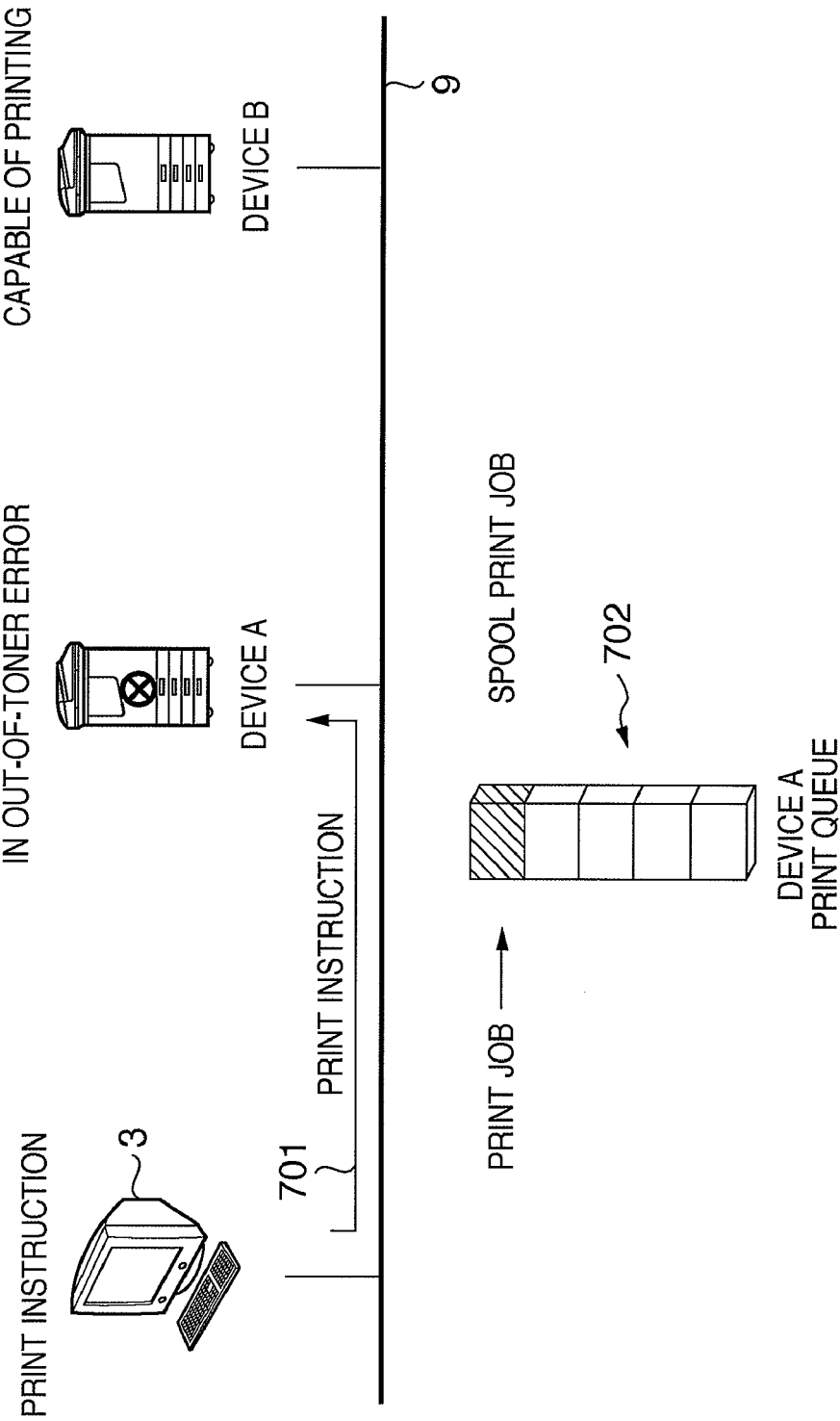
FIG. 7 is a diagram illustrating a case where a print job is issued in a system according to Embodiment 1 of the present invention.

FIG. 7 is a diagram illustrating when a print job is issued in the system according to Embodiment 1 of the present invention. In the system of Embodiment 1, a plurality of multi-function peripherals (Devices A and B) are connected to the PC 3 via the network 9 as shown in FIG. 1.

In FIG. 7, a print job is issued from the PC 3 to a multi-function peripheral A (first printing apparatus, or Device A), and a print instruction 701 is sent to the multi-function peripheral A. This print job is processed as a receive job by the CPU 33 of the multi-function peripheral A, and is associated with a job ID issued during that process and saved on the DRAM 38 or the hard disk 8 (or 8a). As indicated by the arrow 702, the print job is spooled in a print queue in the order of arrival and managed. Ordinarily, print jobs are printed in the order in which they were spooled. A print job includes data that specifies job data (data to be printed such as image data, code data, rendering instruction data, print settings data, etc.), the person who instructed the job, the date and time when the job was instructed, etc.

At this time, it is assumed that the multi-function peripheral A is in a state in which it is unable to perform printing due to being out of toner. The problem is not limited to being out of toner, and can be a problem that can be resolved by the user, such as being out of paper, or a problem that requires the user to call on a service company to resolve, such as a component malfunction. In this case, the user can provide an instruction to transfer the print job to another multi-function peripheral (second printing apparatus, or Device B) through the operating unit 7 of the multi-function peripheral A. Such a transfer instruction can be issued not only when a problem has occurred in the device, but also when the device is busy. It is also possible that such a job transfer instruction is set in advance for the device or job, and issued automatically when a predetermined condition is satisfied. Specifically, the following are conceivable: the multi-function peripheral A transfers all of the jobs received after 22:00 to the multi-function peripheral B; jobs submitted by User P are automatically transferred to a multi-function peripheral C if the jobs have not been printed even after 10 minutes have passed; etc. In the following description, no distinction is made between whether transfer instructions are issued manually or automatically.

Figure 11:
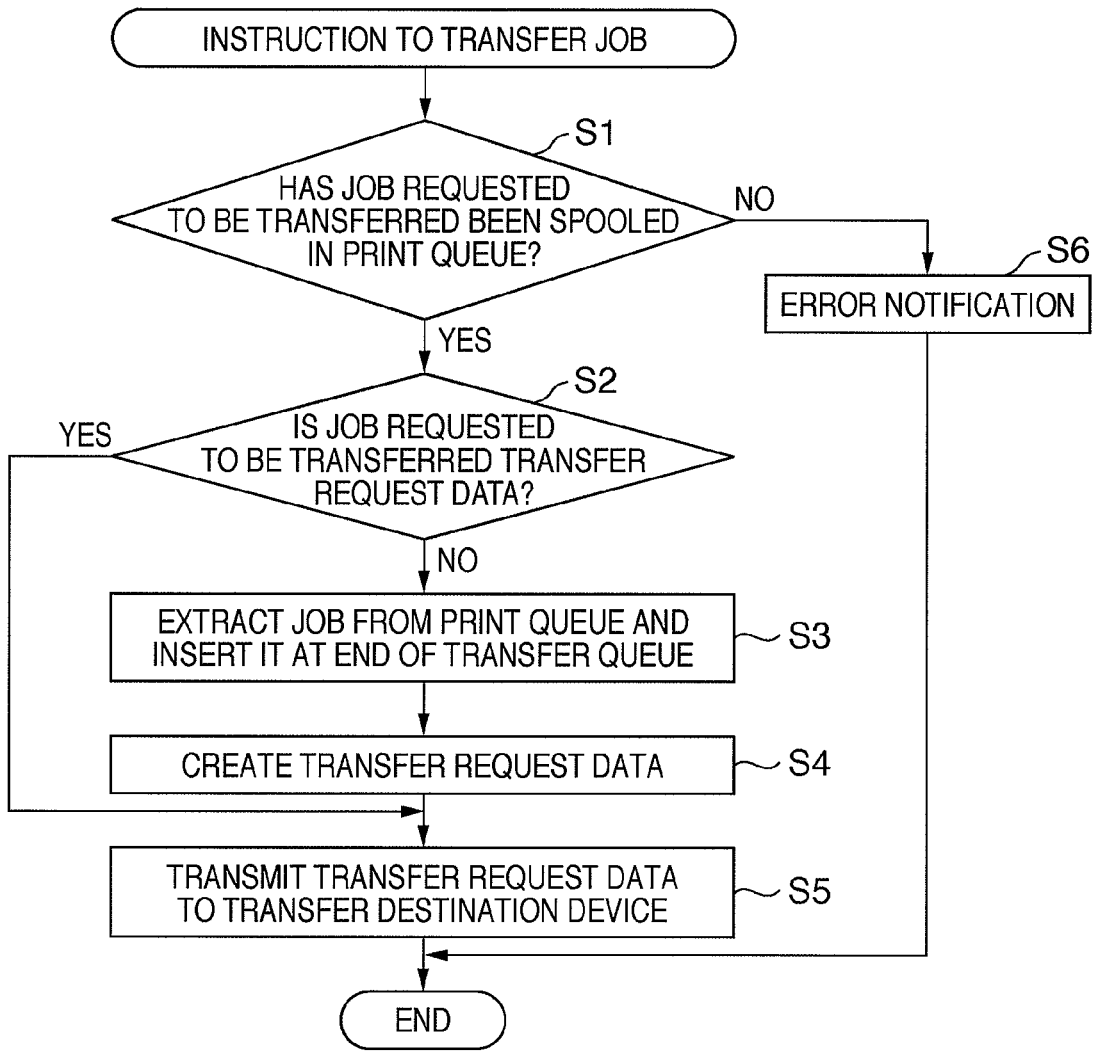
FIG. 11 is a flowchart illustrating a control process performed by a multi-function peripheral in which an instruction (event) to transfer a job is generated according to Embodiment 1.

FIG. 11 is a flowchart illustrating a control process performed by a multi-function peripheral in which a job transfer instruction (event) has occurred (Device A in the example of FIG. 7) according to Embodiment 1. Note that a program that executes this process has been stored in the ROM 36, and is executed by the CPU 33. The CPU 33 manages two queues: a print queue and a transfer queue. The print queue manages jobs waiting to be printed, and the transfer queue manages jobs waiting to be transferred upon the issuance of a transfer instruction. Ordinarily, the print queue starts print processing in the order of arrival at the queue, and for this reason, it is necessary to control the order of arrival. The transfer queue, meanwhile, performs transfer processing without complying with the order of arrival, and thus it does not have to manage the order of arrival.

The process of FIG. 11 starts upon receiving a job transfer instruction. After recognizing the job transfer instruction, the CPU 33 of the multi-function peripheral A determines, in step S1, whether the job has been spooled in the print queue. If it is determined that the job has not been spooled in the print queue, the processing advances to step S6, where the user is notified of an error because the job that cannot be transferred has been instructed to be transferred, and the processing ends. This case can occur when, for example, the job was present in the print queue at the point in time when the transfer instruction was received, but the print processing of the job has been started when this process is executed.

If, on the other hand, it is determined in step S1 that the job exists in the print queue, the processing advances to step S2, where it is determined whether the job is a print job or transfer request data. If the job is transfer request data, the job is spooled in the print queue of Device A as a transfer request from another device. The transfer request is a job that instructs Device A to transfer to another device. In this case, the processing advances to step S5, where the transfer request data is extracted from the print queue, and is transmitted to Device B that has been designated as a transfer destination via the LAN 9. As used herein, "transfer request data" refers to data for requesting transfer of a print job, and includes information that can specify the print job, but does not include job data itself. By storing this transfer request data in the print queue, when the transfer request data reaches a predetermined position (the top or upper position) of the print queue, a request to transfer print data specified by the transfer request data is made. Through this, the transferred print job can be executed.

If, on the other hand, it is determined in step S2 that the job is not transfer request data, or in other words, that the job is a print job, the processing advances to step S3, and the transfer process of the job is started. Here, because there is a possibility that Device A serving as the transfer source may start printing the job after the transfer process of the job is started, the job is extracted from the print queue and is inserted at the end of the transfer queue.

Figure 8:
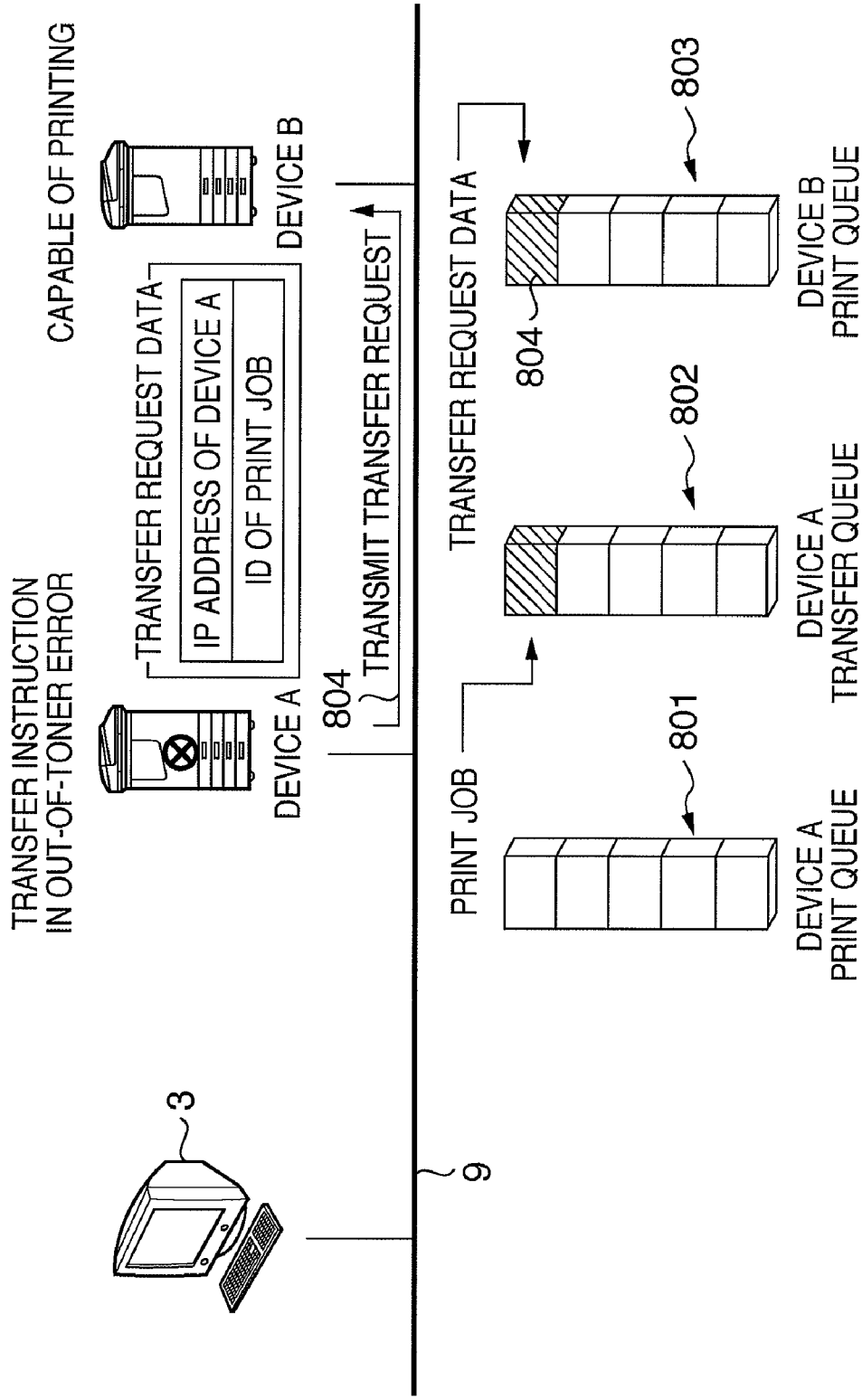
FIG. 8 is a diagram illustrating a case where transfer request data is transmitted from Device A (a multi-function peripheral A) to Device B (a multi-function peripheral B).

FIG. 8 is a diagram illustrating when the transfer request data is transmitted from the multi-function peripheral A (Device A) to the multi-function peripheral B (Device B).

In response to a transfer instruction, in Device A, the print job stored in the print queue 801 is moved to the transfer queue 802.

The processing then advances to step S4, where transfer request data is created. The transfer request data is data that can specify at least a transfer source device and a job of the transfer source. The transfer request data includes, for example, as shown in FIG. 8, the IP address (identification information) of Device A and the job ID (job's identification information) of the job to be transferred.

Next, the processing advances to step S5, where the transfer request data created in step S4 is transmitted to Device B via the LAN 9. At this time, the job data itself is not transferred.

As shown in FIG. 8, the transfer request data 804 is transmitted to Device B, and is stored in a print queue 803 of Device B. Then, upon receiving a transmission request of job data that is to be transmitted in accordance with the transfer request data from Device B, the print job stored in the transfer queue 802 is transmitted to Device B.

Figure 12:
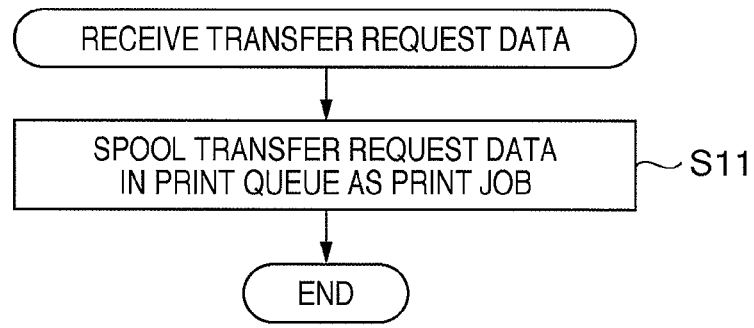
FIG. 12 is a flowchart illustrating a process performed when Device B receives transfer request data from Device A according to Embodiment 1.

FIG. 12 is a flowchart illustrating a process performed by Device B upon receiving the transfer request data 804 from Device A according to Embodiment 1. Note that a program that executes this process has been stored in the ROM 36, and is executed by the CPU 33.

This process starts upon receiving the transfer request data 804. Upon receiving the transfer request data, the CPU 33 of the multi-function peripheral B inserts, in step S11, the transfer request data at the end of the print queue as in the case of an ordinary print job. This state is shown by the arrow 803 in FIG. 8. The transfer request data 804 thus received is put into the print queue of Device B in the order of arrival as a print job and waits in the print queue for the job to be started.

Figure 13:
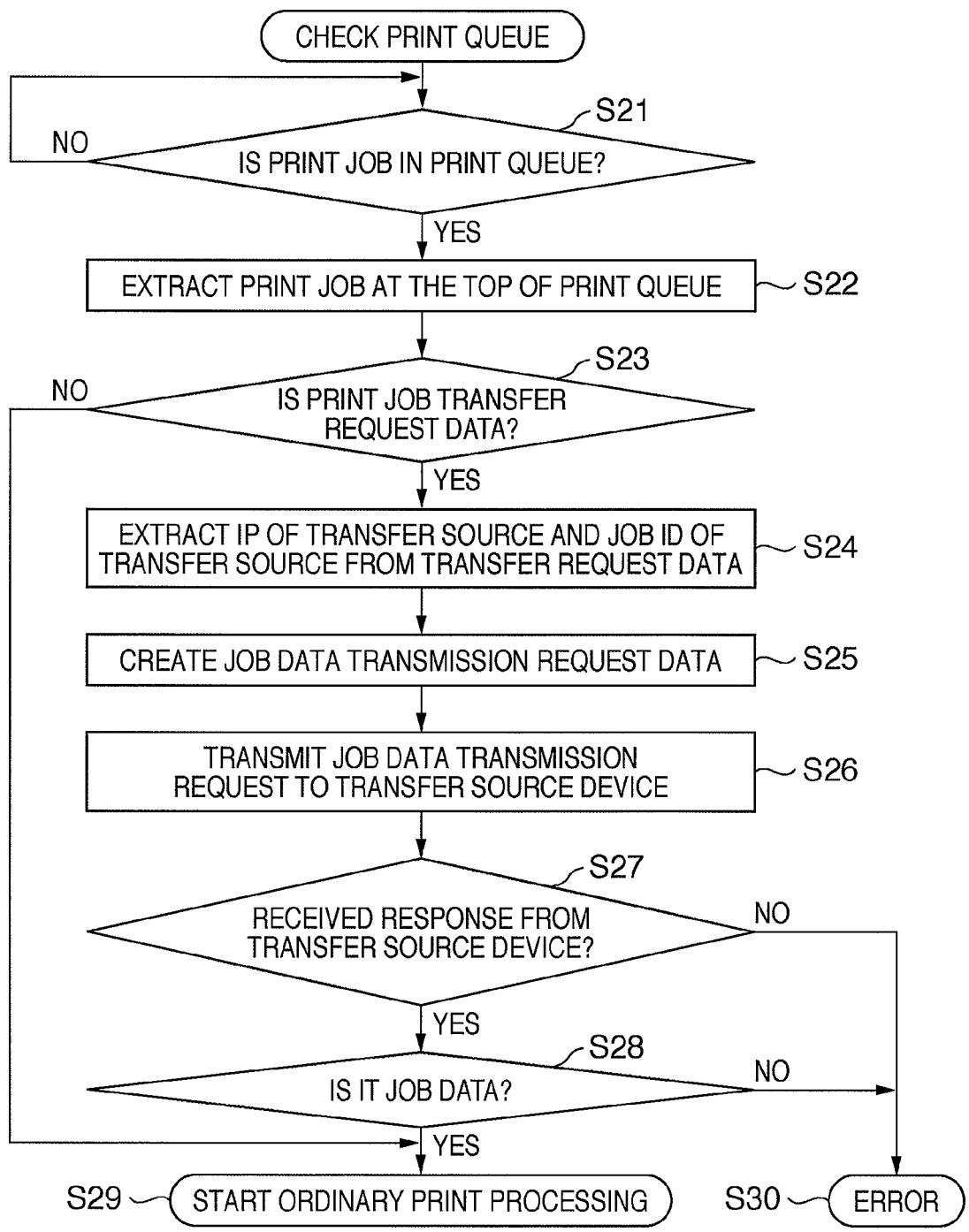
FIG. 13 is a flowchart illustrating a process spanning from when Device B serving as a transfer destination checks a print queue to when it starts printing according to Embodiment 1.

FIG. 13 is a flowchart illustrating a process spanning from when Device B serving as a transfer destination checks the print queue to when it starts printing according to Embodiment 1. Note that a program that executes this process has been stored in the ROM 36, and is executed by the CPU 33.

First, in step S21, the CPU 33 of Device B checks the presence/absence of a print job stored in the print queue. If there is no print job in the print queue, the presence/absence of a job in the print queue is checked again after a predetermined period. If it is determined in step S21 that there is a print job in the print queue, the processing advances to step S22, where the print job at the top of the print queue is extracted. In this step, the presence of any data in the print queue is determined because transfer request data can exist in the print queue instead of a print job.

Figure 9:
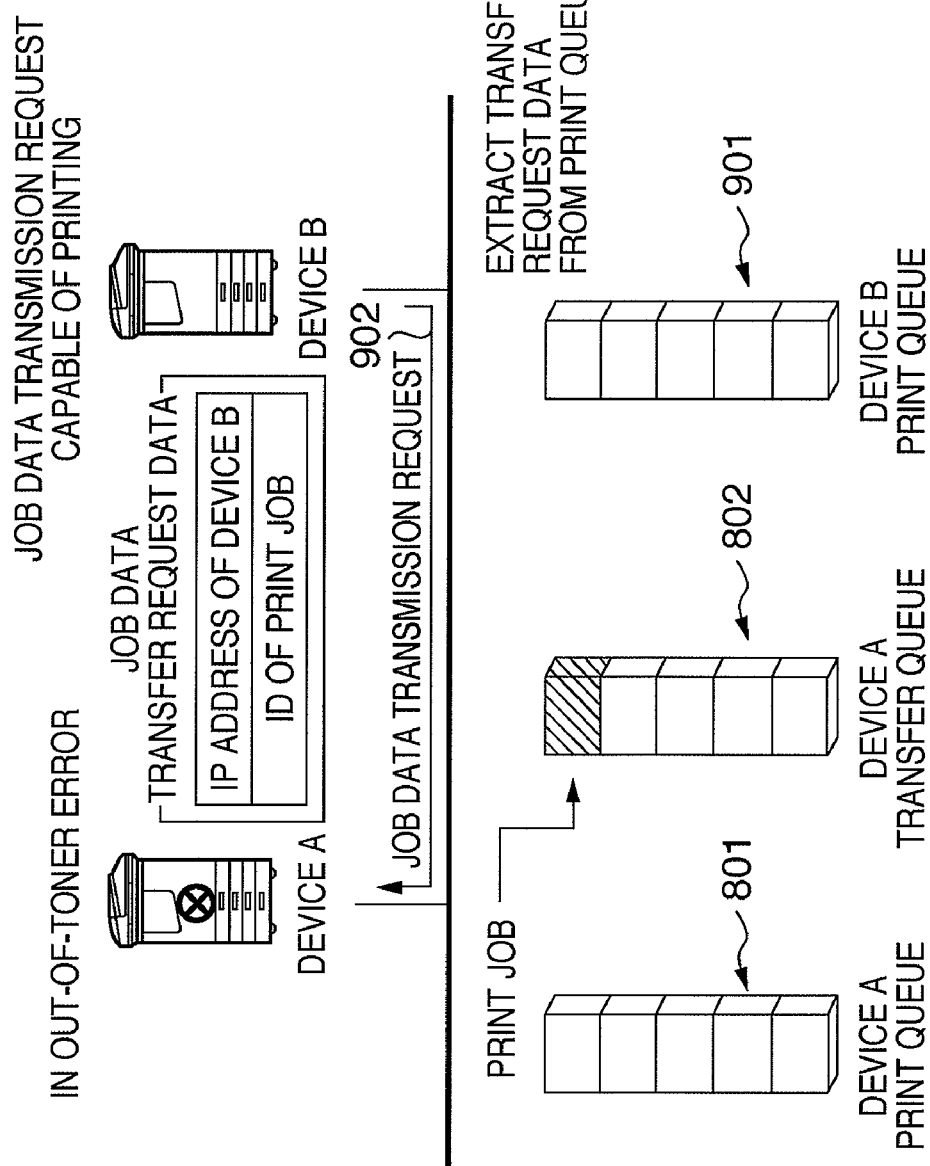
FIG. 9 is a diagram illustrating an operation of Device B according to Embodiment 1.

FIG. 9 is a diagram illustrating an operation of Device B according to Embodiment 1.

A print queue 901 of FIG. 9 shows the state after step S22 has been executed. In the print queue 901, transfer request data 804 shown in FIG. 8 has been read out at the timing of execution of the job stored in the print queue of Device B, and thus the print queue of Device B is empty.

The processing then advances to step S23, where it is determined whether the print job extracted in step S22 is an ordinary print job or transfer request data. If the print job is an ordinary print job, because Device B is in a state where it can start print processing for the job, the processing advances to step S29, and the ordinary print processing is started.

If, on the other hand, the print job extracted in step S22 is transfer request data, the processing advances to step S24, where the IP address of the transfer source device (Device A in this example) and the job ID of the transfer source are extracted from the transfer request data extracted in step S22. Next, the processing advances to step S25, where job data transmission request data for requesting job data is created. The job data transmission request data is data that can specify at least a transfer destination device (Device B in this example) and the job of the transfer source.

For example, as shown in FIG. 9, the job data transmission request data includes the IP address of Device B and the job ID of the job being processed.

Then, the processing advances to step S26, where the job data transmission request data created in step S25 is transmitted to the transfer source device (Device A in this example) via the LAN 9.

This state is shown in FIG. 9, in which job data transmission request data 902 is transmitted from Device B to Device A.

Then, the processing advances to step S27, where Device B waits for a response from the transfer source device (Device A in this example). If there is no response for a predetermined period, it is assumed that the transfer source device (Device A in this example) is in a state in which it cannot respond to the job data transmission request for some reason, such as that access to the transfer source device (Device A in this example) via the network 9 is not possible or that the transfer source device is not under normal operation. In such a case, the processing advances to step S30, where an error notification is made because the job transfer is not possible. The print job then ends.

If, on the other hand, there is a response in step S27, the processing advances to step S28, where the content of the response is checked. If the content of the response is not job data, but a response that provides an error notification, it is assumed that communication with the transfer source device has been established but the transfer source device is in a state in which it cannot transfer the job for some reason, and thus the processing advances to step S30, where the error notification is made, after which the print job ends. Such an error notification in step S30 is performed when, for example, the job in the transfer queue has been deleted by rebooting performed without saving the content of the transfer queue in the nonvolatile memory, or when a hardware malfunction has occurred in the storage medium that stores the transfer queue. If, on the other hand, job data is received as a response in step S28, the processing advances to step S29, where print processing is started based on the job data. Here, the transmission request data is transmitted when the transfer request data reaches the top of the print queue, but it is also possible to transmit the transmission request data when the transfer request data reaches a predetermined upper position, rather than the top.

Figure 14:
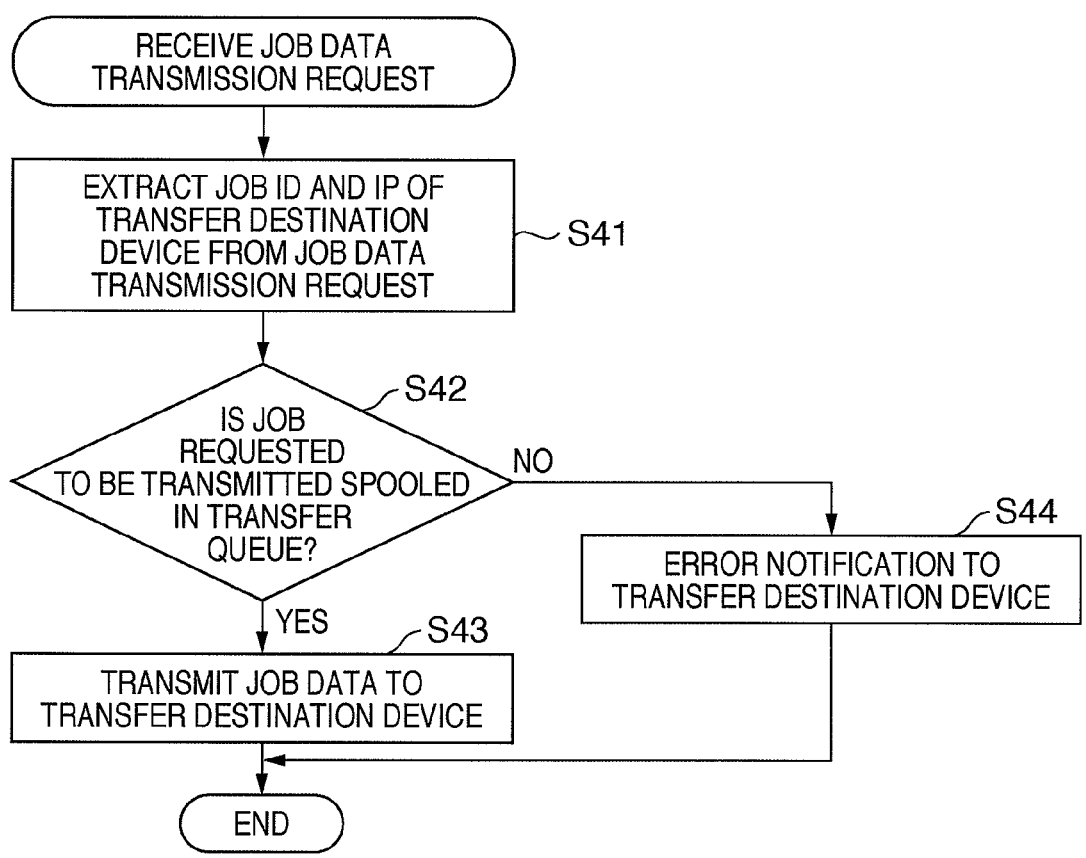
FIG. 14 is a flowchart illustrating a control process performed by a transfer source device that has received job data transmission request data in a system according to an embodiment of the present invention.

FIG. 14 is a flowchart illustrating a control process performed by the transfer source device (Device A in this example) that has received the job data transmission request data in the system according to the present embodiment. Note that a program that executes this process has been stored in the ROM 36, and is executed by the CPU 33.

This process starts upon receiving the job data transmission request data. First, in step S41, the job ID and the IP address of the transfer destination are extracted from the job data transmission request data. Next, the processing advances to step S42, where it is determined whether a job that corresponds to the job ID extracted in step S41 is in the own print queue. If there is no corresponding job, because it is impossible to transfer the instructed job data, the processing advances to step S44, where the transfer destination device is notified of an error using the IP address of the transfer destination device extracted in step S41, and the processing ends.

If, on the other hand, there is a corresponding job in step S42, the processing advances to step S43, where the job data is transmitted to the transfer destination device using the IP address of the transfer destination device extracted in step S41. Then, the job data is removed from the transfer queue, and this process ends.

Figure 10:
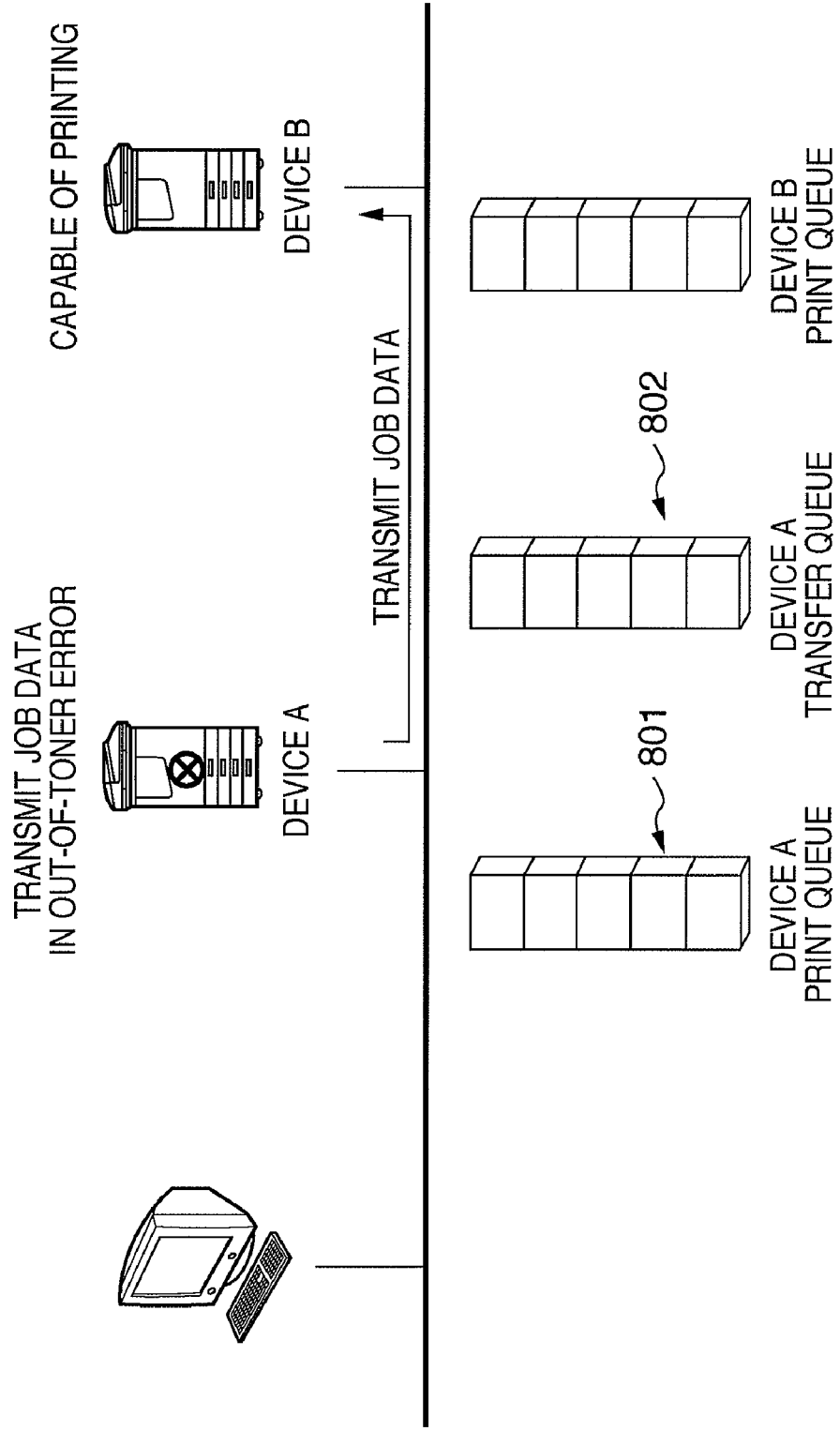
FIG. 10 is a conceptual diagram illustrating a case where job data is transmitted from a transfer source device to a transfer destination device according to Embodiment 1.

FIG. 10 is a conceptual diagram illustrating when job data is transmitted from a transfer source device to a transfer destination device according to Embodiment 1.

In FIG. 10, job data is transmitted from Device A serving as the transfer source to Device B serving as a transfer destination, and thus the job data is removed from the transfer queue 802 of Device A.

In order to describe the present embodiment, communication occurring between devices shall be described with reference to sequence diagrams of FIGS. 15 to 17.

Figure 15:
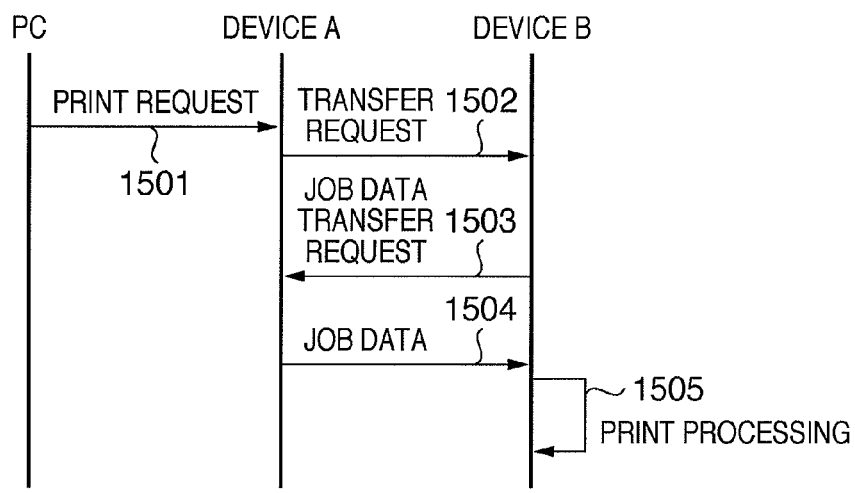
FIG. 15 is a diagram illustrating a sequence for the simplest process for transferring a job.

FIG. 15 is a diagram illustrating a sequence for the simplest process for transferring a job. In FIG. 15, PC, Device A and Device B are connected to one another with the LAN 9, as in FIG. 7. The following describes a sequence performed when, after a print request is issued from PC to Device A, Device A provides a transfer instruction to Device B.

First, in 1501, a print job is transmitted from PC to Device A. Subsequently, if an instruction to transfer the print job is issued to Device A, transfer request data indicative of a transfer request is transmitted from Device A to Device B (1502). In 1503, when a job is started by the transfer request data spooled in the print queue of Device B, job data transmission request data is transmitted as a job data transmission request from Device B to Device A. Upon receiving the job data transmission request, Device A transmits job data to Device B in 1504. Then, upon receiving the job data, Device B executes print processing based on the job data.

Figure 16:
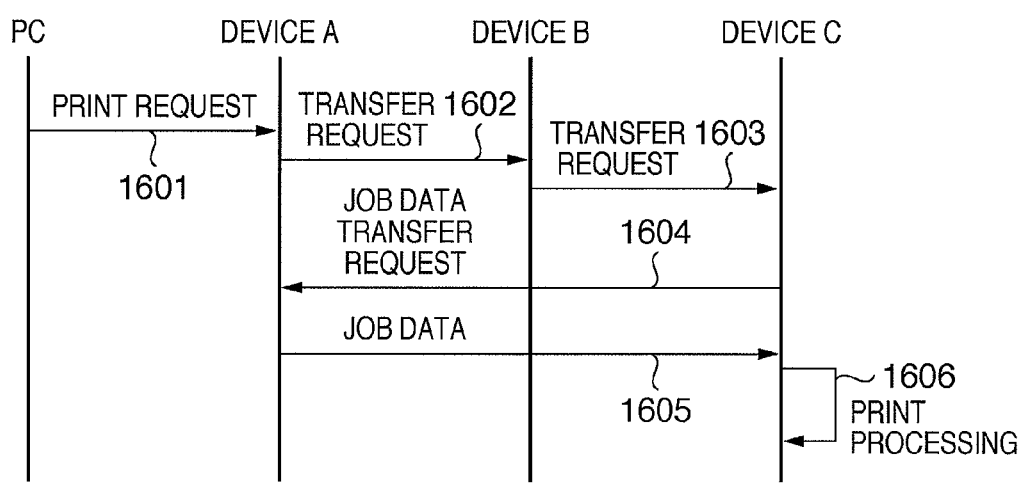
FIG. 16 is a diagram illustrating a sequence performed when a job is further transferred from the job's transfer destination device to another device.

FIG. 16 is a diagram illustrating a sequence performed when a job is further transferred from the job's transfer destination device to another device. In FIG. 16, PC, Device A, Device B and Device C are all connected to one another with the same network 9.

Here, a sequence that is performed when, after a print request is issued from PC to Device A, Device A instructs a job transfer to Device B, and Device B transfers the job to Device C, shall be described.

First, in 1601, a print request is transmitted from PC to Device A. Then, if a transfer instruction is issued to Device A, in 1602, transfer request data is transmitted as a transfer request from Device A to Device B. If a transfer instruction is issued to Device B, in 1603, the transfer request data received in 1602 is transferred from Device B to Device C. When the transfer request data spooled in the print queue of Device C in this manner starts the job, in 1604, job data transmission request data as a job data transmission request is transmitted from Device C to Device A. Upon receiving the job data transmission request, Device A transmits the job data to Device C in 1605. Upon receiving the job data, Device C executes print processing on the job data in 1606.

As described above, according to the present embodiment, even when a job transferred to a transfer destination device is further transferred to another transfer destination device, the job data is transferred directly from the transfer source (Device A) to the final transfer destination (Device C). This eliminates unnecessary transfer of the job data to an intermediate device (Device B), and it is therefore possible to improve throughput of the print processing of the job.

Figure 17:
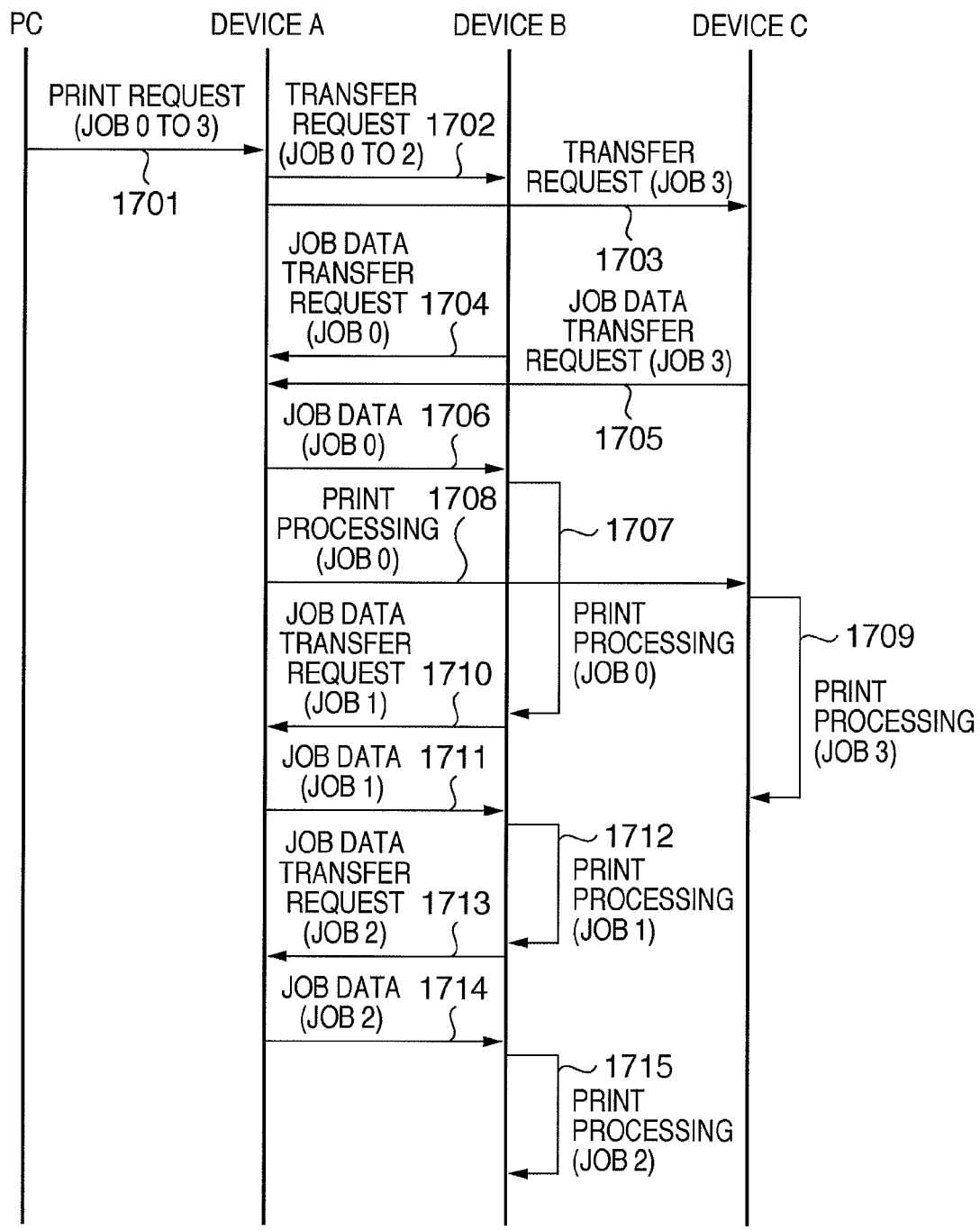
FIG. 17 is a diagram illustrating a sequence performed when a plurality of jobs are transferred at a time in a system according to an embodiment of the present embodiment.

FIG. 17 is a diagram illustrating a sequence performed when a plurality of jobs are transferred simultaneously in the system according to the present embodiment. In FIG. 17, PC, Device A, Device B and Device C are all connected to one another with the same network 9. The following describes a sequence performed when, after a request to print Jobs 0 to 3 is issued from PC to Device A, an instruction to transfer Jobs 0 to 2 from Device A to Device B is issued, and an instruction to transfer Job 3 from Device to A to Device C is issued.

First, in 1701, a request to print Jobs 0 to 3 is transmitted from PC to Device A. Next, when an instruction to transfer Jobs 0 to 2 to Device B is issued to Device A, in 1702, transfer request data corresponding to Jobs 0 to 2 is transmitted from Device A to Device B as a transfer request. Also, when an instruction to transfer Job 3 to Device C is issued to Device A, in 1703, transfer request data corresponding to Job 3 is transmitted from Device A to Device C as a transfer request.

Next, when the transfer request data corresponding to Job 0 that has been spooled in the print queue of Device B starts the job in Device B, in 1704, job data transmission request data corresponding to Job 0 is transmitted from Device B to Device A as a job data transmission request.

When the transfer request data corresponding to Job 3 that has been spooled in the print queue of Device C starts the job in Device C, in 1705, job data transmission request data corresponding to Job 3 is transmitted from Device C to Device A as a job data transmission request.

Upon receiving the job data transmission request corresponding to Job 0, Device A transmits job data corresponding to Job 0 to Device B in 1706. Through this, Device B receives the job data corresponding to Job 0, and executes print processing based on the job data.

Upon receiving the job data transmission request corresponding to Job 3 from Device C, Device A transmits job data corresponding to Job 3 to Device C in 1708. Through this, Device C receives the job data corresponding to Job 3, and executes print processing on Job 3 in 1709.

After Device B finishes the print processing for Job 0, in 1710, the transfer request data corresponding to Job 1 that has been spooled in the print queue of Device B starts the job. Then, in 1710, Device B transmits job data transmission request data corresponding to Job 1 to Device A as a job data transmission request from Device B to Device A. Though this, Device A receives the job data transmission request corresponding to Job 1, and transmits job data corresponding to Job 1 to Device B in 1711. Upon receiving the job data corresponding to Job 1, Device B executes the print processing for job 1 in 1712.

Furthermore, when Device B finishes print processing on Job 1, the transfer request data corresponding to Job 2 that has been spooled in the print queue of Device B starts the job. In 1713, job data transmission request data corresponding to Job 2 is transmitted as a job data transmission request from Device B to Device A. Through this, Device A receives the job data transmission request corresponding to Job 2, and transmits job data corresponding to Job 2 to Device B in 1714.

Upon receiving the job data corresponding to Job 2, Device B executes print processing on Job 2 in 1715.

As described above, according to Embodiment 1, job data is transmitted at the time when all of the devices can start the job, and thus all of the devices can be operated in parallel in an efficient manner.

In contrast, with a sequence of conventional technology in which job data is transmitted in the order of arrival in accordance with transfer instructions, the transfer of subsequent Job 3 is held until the transfer of Jobs 0 to 2 is finished. As a result, it is necessary for the user to wait until Device C starts print processing.

According to the present embodiment, throughput can be improved without waiting unnecessarily. In other words, in order to improve throughput, the configurations described above enable a transfer request and the job data to be transmitted at different timings. That is, when a print job is transferred to another printing apparatus to print the job, an unnecessary transfer process of job data can be eliminated, and it is thus possible to prevent an increase in network traffic and wait time for printing.

Embodiment 2

In Embodiment 1, in order for a transfer source device and a transfer destination device to specify each other during communication, transfer request data and job data transmission request data are used separately, whereas Embodiment 2 describes a control flow of transfer process when a transfer destination device and a transfer source device has been registered in advance in device settings. The system configuration and the configuration of the MFP and the like of Embodiment 2 are the same as those of Embodiment 1, and thus descriptions thereof are omitted here.

Embodiment 2 can be applied to a case where the user manually issues a transfer instruction to a device, but it is effective particularly in a case where a transfer instruction is executed automatically in accordance with a preset condition.

For the sake of simplicity, Embodiment 2 shall be described in the context where a transfer instruction is executed automatically.

Figure 6:
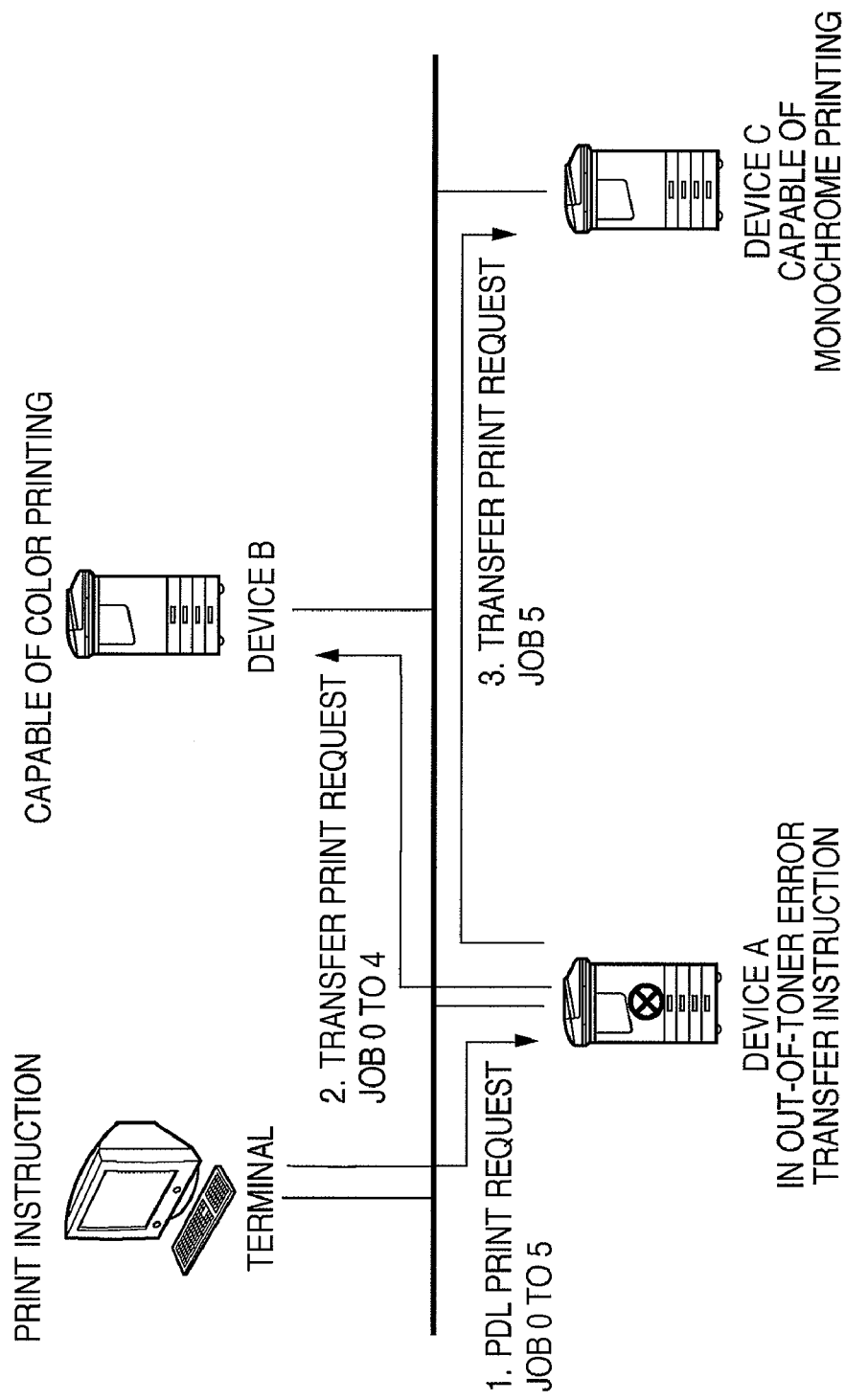
FIG. 6 is a diagram illustrating another problem encountered in conventional technology.

As the preset condition, for example, the state of device or job can be used. Specifically, a setting is conceivable in which, for example, the multi-function peripheral A transfers all of the jobs received after 22:00 to the multi-function peripheral B. Alternatively, a setting is conceivable in which jobs submitted by User P are automatically transferred to the multi-function peripheral C if the jobs have not been printed even after 10 minutes. Automatic transfer settings may be made for each device, or a device that serves as a server on a network may manage the settings collectively. It is of course possible to use the same control flow of transfer process as used in Embodiment 1 even when automatic transfer settings are made. The present embodiment is also applicable to a case as shown in FIG. 6 in which color print jobs and monochrome print jobs are transferred automatically to respective devices.

In the server/client model, it may be effective to employ a configuration in which only a transfer source or transfer destination is specified through device settings.

The present embodiment may be configured to specify only a transfer destination device or transfer source device through device settings.

The following describes an embodiment in which, when automatic transfer settings have been made, specification of the transfer source and specification of a transfer destination are made on a device-by-device basis through settings.

The job transfer instruction of transfer source and the process for receiving transfer request data of transfer destination are the same as those of Embodiment 1, and thus descriptions thereof are omitted here.

Embodiment 1 has been described in the context of the constituent elements of transfer request data being information that specifies the transfer source device (e.g., the IP of the transfer source device) and information that specifies the job of the transfer source (e.g., the job ID of the transfer source). However, in the present embodiment, information regarding the transfer source device is obtained from device settings, rather than transfer request data. For this reason, transfer request data can include only information that specifies the job of the transfer source.

Embodiment 1 has been described in the context of the constituent elements of job data transmission request data being information that specifies a transfer destination device (e.g., the IP of a transfer destination device) and information that specifies the job of the transfer source (e.g., the job ID of the transfer source). However, in the present embodiment, information regarding a transfer destination is obtained from device settings, rather than job data transmission request data. For this reason, job data transmission request data can include only information that specifies the job of the transfer source.

A flow for checking the print queue performed by a transfer destination device shall be described next.

In step S24 of FIG. 13, the IP of the transfer source device is extracted from device settings, rather than transfer request data. Other than this, the processing is the same as that of Embodiment 1, and thus descriptions thereof are omitted here.

A flow for receiving a job data transmission request performed by a transfer source device shall be described.

In step S41 of FIG. 14, the IP address of the transfer destination device is extracted from device settings, rather than job data transmission request data. Other than this, the processing is the same as that of Embodiment 1, and thus a description thereof is omitted here.

With the configuration described above, a transfer request and job data can be transmitted at different timings with preset automatic transfer device settings, rather than communication data.

The above embodiments have been described taking the case where a print job is issued from a PC as an example, but the embodiments are not limited thereto. The embodiments are applicable to a copy job in which image data from the reader unit 2 is printed by the printer unit 6, printing of a FAX job received via a telephone line, and print jobs received by various methods.

Furthermore, jobs other than print jobs can be transferred to another device. In this case, it is only necessary to replace the print queue with a queue for the type of the job.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-325210 filed on Dec. 17, 2007, which is hereby incorporated by reference herein in its entirety.

What is claimed is:

1. A printing system including an information processing apparatus, a first printing apparatus and a second printing apparatus that are connectable to each other via a network, the printing system comprising:
a first issuing unit configured to, in order to transfer job data stored in the information processing apparatus to the first printing apparatus, cause the information processing apparatus to issue specifying data that specifies the job data to the first printing apparatus, wherein the specifying data does not include the job data;

a second issuing unit configured to cause the first printing apparatus to issue a job data transmission request to the information processing apparatus, in a case where the specifying data issued by the first issuing unit reaches to a predetermined position in a queue in which the specifying data issued by the first issuing unit is spooled;

a first transmitting unit configured to cause the information processing apparatus to transmit the job data to the first printing apparatus in response to the job data transmission request issued by the second issuing unit, a first print control unit configured to cause the first printing apparatus to perform printing based on the job data transmitted by the first transmitting unit;

a transferring unit configured to, in order to transmit the job data stored in the information processing apparatus to the second printing apparatus, cause the first printing apparatus to transfer the specifying data in the queue to the second printing apparatus, in a case where the specifying data issued by the first issuing unit does not reach to the predetermined position in the queue;

a third issuing unit configured to cause the second printing apparatus to issue a job data transmission request to the information processing apparatus, in a case where the specifying data transferred by the transferring unit reaches to a predetermined position in a queue in which the specifying data transferred by the transferring unit is spooled;

a second transmitting unit configured to cause the information processing apparatus to transmit the job data to the second printing apparatus in response to the job data transmission request issued by the third issuing unit; and a second print control unit configured to cause the second printing apparatus to perform printing based on the job data transmitted by the second transmitting unit.

2. The printing system according to claim 1, wherein the specifying data includes at least identification information that specifies the information processing apparatus and identification information of the print job.

3. The printing system according to claim 1, wherein the job data transmission request issued by the second issuing unit includes at least identification information that specifies the first printing apparatus and identification information that specifies the print job, and the job data transmission request issued by the third issuing unit includes at least identification information that specifies the second printing apparatus and identification information that specifies the print job.

4. A printing apparatus connected to an external apparatus via a network, the apparatus comprising:

a storing unit configured to, upon receiving specifying data that specifies job data from the external apparatus, store the specifying data in a queue in which the specifying data is spooled, wherein the specifying data does not include the job data;

a transmission unit configured to transmit a job data transmission request to the external apparatus in a case where the specifying data in the queue reaches to a predetermined position in the queue;

a receiving unit configured to receive job data transmitted from the external apparatus in response to the transmission request transmitted by the transmission unit;

a printing unit configured to perform printing based on the job data; and a transferring unit configured to, in order to transmit job data stored in the external apparatus to another printing apparatus, transfer the specifying data in the queue to the other printing apparatus, in a case where the specifying data does not reach to the predetermined position in the queue.

5. The printing apparatus according to claim 4, wherein the specifying data includes at least identification information that specifies the external apparatus and identification information of the print job.

6. The printing apparatus according to claim 4, wherein the job data transmission request includes at least identification information that specifies the printing apparatus and identification information of the print job.

7. A print control method for a printing system including an information processing apparatus, a first printing apparatus and a second printing apparatus that are connectable to each other via a network, the method comprising:

in order to transfer job data stored in the information processing apparatus to the first printing apparatus, causing the information processing apparatus to issue specifying data that specifies the job data to the first printing apparatus, wherein the specifying data does not include the job data;

causing the first printing apparatus to issue a job data transmission request to the information processing apparatus, in a case where the issued specifying data reaches to a predetermined position in a queue in which the issued specifying data is spooled;

causing the information processing apparatus to transmit the job data to the first printing apparatus in response to the issued job data transmission request;

causing the first printing apparatus to perform printing based on the transmitted job data;

in order to transmit the job data stored in the information processing apparatus to the second printing apparatus, causing the first printing apparatus to transfer the specifying data in the queue to the second printing apparatus, in a case where the issued specifying data does not reach to the predetermined position in the queue;

causing the second printing apparatus to issue a job data transmission request to the information processing apparatus, in a case where the transferred specifying data reaches to a predetermined position in a queue in which the transferred specifying data is spooled;

causing the information processing apparatus to transmit the job data to the second printing apparatus in response to the issued job data transmission request; and causing the second printing apparatus to perform printing based on the transmitted job data.

8. A print control method for a printing apparatus connected to an external apparatus via a network, the method comprising:

upon receiving specifying data that specifies job data from the external apparatus, storing the specifying data in a queue in which the specifying data is spooled, wherein the specifying data does not include the job data;

transmitting a job data transmission request to the external apparatus in a case where the specifying data in the queue reaches to a predetermined position in the queue;

receiving job data transmitted from the external apparatus in response to the transmission request transmitted in the transmitting step;

printing based on the job data; and in order to transmit job data stored in the external apparatus to another printing apparatus, transferring the specifying data in the queue to the other printing apparatus, in a case where the specifying data does not reach to the predetermined position in the queue.

9. A non-transitory computer-readable storage medium storing a program which causes a computer to execute a control method for a printing apparatus connected to an external apparatus via a network, the method comprising:

upon receiving specifying data that specifies job data from the external apparatus, storing the specifying data in a queue in which the specifying data is spooled, wherein the specifying data does not include the job data;

transmitting a job data transmission request to the external apparatus in a case where the specifying data in the queue reaches to a predetermined position in the queue;

receiving job data transmitted from the external apparatus in response to the transmission request transmitted in the transmitting step;

printing based on the job data; and in order to transmit job data stored in the external apparatus to another printing apparatus, transferring the specifying data in the queue to the other printing apparatus, in a case where the specifying data does not reach to the predetermined position in the queue.

* * * * *